United States Patent
Saifullah et al.

(10) Patent No.: US 6,771,962 B2
(45) Date of Patent: Aug. 3, 2004

(54) APPARATUS, AND AN ASSOCIATED METHOD, BY WHICH TO PROVIDE TEMPORARY IDENTIFIERS TO A MOBILE NODE INVOLVED IN A COMMUNICATION HANDOVER

(75) Inventors: Yousuf Saifullah, Flower Mound, TX (US); Basavaraj Patil, Coppell, TX (US); Shavantha Kularatna, Flower Mound, TX (US); Rene Purnadi, Coppell, TX (US); Stefano Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 565 days.

(21) Appl. No.: 09/822,987

(22) Filed: Mar. 30, 2001

(65) Prior Publication Data

US 2002/0142771 A1 Oct. 3, 2002

(51) Int. Cl.[7] .................................................. H04Q 7/20
(52) U.S. Cl. ...................................... 455/436; 455/437
(58) Field of Search ................................. 455/436–438, 455/428, 439, 435.1, 440, 433

(56) References Cited

U.S. PATENT DOCUMENTS 4,833,701 A      5/1989   Comroe et al. ................ 379/60
5,408,683 A      4/1995   Ablay et al. ................. 455/33.1
5,457,680 A     10/1995   Kamm et al. ................... 370/17
6,058,311 A  *   5/2000   Tsukagoshi ............... 455/435.1
6,073,016 A  *   6/2000   Hulthen et al. ........... 455/435.2
6,172,986 B1     1/2001   Watanuki et al. ............ 370/466
6,212,380 B1 *   4/2001   Laatu ........................... 455/436
6,385,451 B1 *   5/2002   Kalliokulju et al. ......... 455/437
6,397,065 B1 *   5/2002   Huusko et al. ........... 455/435.2
6,553,227 B1 *   4/2003   Ho et al. ...................... 455/433
6,577,874 B1 *   6/2003   Dailey ......................... 455/521

FOREIGN PATENT DOCUMENTS

EP         0 446 318 B1     6/1996
EP         0 859 531 A2     8/1998

* cited by examiner

Primary Examiner—William Trost
Assistant Examiner—Brandon J Miller

(57) ABSTRACT

Apparatus, and an associated method, for a mobile communication system in which handovers of communications are effectuated between access points of the communication system as a mobile node travels there through. A manner is provided by which to perform handover evaluation functions more efficiently by performing at least some of the handover evaluations at the access point to which a mobile node is attached. And, a manner is provided by which to provide care-of-addresses formed of temporary identifiers to temporarily identify a mobile node to permit the routing of packet data thereto during a communication session.

19 Claims, 4 Drawing Sheets

APPARATUS, AND AN ASSOCIATED METHOD, BY WHICH TO PROVIDE TEMPORARY IDENTIFIERS TO A MOBILE NODE INVOLVED IN A COMMUNICATION HANDOVER

The present invention relates generally to a manner by which to communicate packet-based data in a mobile communication system in which communication handovers are effectuated between radio access points. More particularly, the present invention relates to apparatus, and an associated method, by which to more efficiently provide a temporary identifier to a mobile node with which a communication handover is to be effectuated. The present invention further advantageously provides apparatus, and an associated method, by which more efficiently to perform handoff evaluations, responsive to which communication handovers are effectuated. Through operation of an embodiment of the present invention, more efficient communications are effectuable.

BACKGROUND OF THE INVENTION

Advancements in communication technologies have permitted the development, and introduction, of new types of communication systems of improved characteristics. Such new types of communication systems have generally permitted the communication of data at increased throughput rates or made more convenient, or even possible, the transmission of data in various communication applications.

The advancements in communication technologies have, for example, permitted the introduction and popularization of new types of radio communication systems. The radio communication systems are advantageously utilized as radio links to form at least portions of communication paths formed between sending and receiving stations of the radio communication systems. Conventional wireline connections are obviated in lieu of the use instead of radio links. Increased communication mobility, relative to conventional wireline communication systems, is thereby generally possible when communications are effectuated by way of a radio communication system.

A cellular communication system is exemplary of a radio communication system which has been made possible as a result of advancements in communication technologies. A cellular communication system, in general, is formed of a network infrastructure which is installed through a geographic area. Spaced-apart fixed-site transceivers define cells of the communication system. A subscriber to the cellular communication system is capable of communicating therethrough by way of a mobile station when positioned within the geographic area encompassed by the network infrastructure of the cellular communication system. Normally, a radio link is formed between the mobile station and the fixed-site transceiver which defines the cell at which the mobile station is located when communications are to be effectuated. Because of the mobility permitted of the mobile station, during an ongoing communication session, the mobile station might travel out of one cell and into another. To permit continuation of the communication session, a handover of communications of the mobile station between the fixed-site transceiver defining the respective cells is performed. Continued communications with the mobile station is thereby permitted.

Other types of radio communication systems are operable in manners analogous to cellular communication systems. That is to say, other types of radio communication systems provide for mobility of a mobile transceiver and handovers of communications with successive fixed-site transceivers. A WLAN (wireless local area network) constructed pursuant to the IEEE 802.11 standard, for instance, utilizes handover procedures analogous to those utilized in a cellular communication system.

More generally, such types of radio communication systems can be represented by a mobile node, i.e., a mobile station, which is connected, by way of a radio link, with a radio access point of a radio access network. Handovers are effectuated to successive radio access points of the radio access network as the mobile node travels through an area encompassed by the radio access network.

When the communication system utilizes a packet-based communication scheme, such as an IP (internet protocol) communication scheme, packets of data are communicated between sending and receiving stations of the communication system. A data packet includes a header portion and a payload portion. The header portion identifies the destination to which the packet of data is to be communicated, and the payload portion forms the informational portion of the data packet. Additional complexity in the identification of the destination, indicated by the header portion of the data packet, occurs in a communication system in which destination is a mobile node. Due to the mobile nature of the mobile node, routing of a data packet thereto is made more difficult, particularly by way of a radio access network which includes a plurality of radio access points, any of which can be connected, by way of a radio link, with the mobile node.

In an Ipv6 system, for instance, a mobile node is assigned an IP address and further utilizes a care-of-address when the point of attachment to the radio access network changes. Two manners are conventionally utilized by which to assign an IP address to a mobile node. The manners are referred, respectively, as a stateless autoconfiguration method, and a stateful autoconfiguration method.

Utilization of either conventional method, however, necessitates a delay in the assignation of a care-of-address when a handover of communications of the mobile node is effectuated. In communication applications in which delays must be minimized, such as voice communications and multimedia communications, the delay in the assignation of the address deleteriously affects the communications. Problems are particularly evident when an ongoing multimedia of voice communication session is in progress when the handover of communications, and concomitant new address assignation procedures are carried out.

Additionally, handover evaluations carried out prior to the initiation of a handover of communications necessitates the evaluation of various measurement indicia. When the measurement indicia is communicated utilizing packet-based data, significant signaling is required to provide the necessary information to perform the handover evaluation. Such signaling increases the complexity of the communication system as well as also introducing delays which deleteriously affect communications in the communication system.

What is needed, therefore, is a manner by which better to assign addresses to a mobile node to reduce delays associated with conventional techniques.

What is further needed is a manner better able to provide the necessary information to perform a handover evaluation.

It is in light of this background information related to communications in a packet-based, mobile communication system that the significant improvements of the present invention have evolved.

SUMMARY OF THE INVENTION

The present invention, accordingly, advantageously provides apparatus, and an associated method, by which to communicate packet-based data in a mobile communication system in which communication handovers are effectuated between radio access points.

Through operation of an embodiment of the present invention, a manner is provided by which to more efficiently provide a temporary identifier to a mobile node of which communications therewith are to be handed over between radio access points of the mobile communication system. Also, through operation of an embodiment of the present invention, a manner is provided by which more efficiently to perform handoff evaluations, responsive to which communication handovers are effectuated.

In one aspect of the present invention, handover evaluation procedures are performed at a radio access point in which active communications are ongoing with a mobile node. Responsive to the handoff evaluation performed at the active radio access point, a handover of communications is effectuated to permit continued communications of the mobile node with a target radio access point. Because the handoff evaluation procedure is performed at the radio access point, lesser amounts of signaling to perform the handoff evaluation procedure is required in contrast to conventional handoff evaluations procedures which are conventionally performed at a central point.

In another aspect of the present invention, both the active and target radio access points are interconnected, thereby to permit measurements performed at the target radio access point to be provided to the active radio access point. And, the mobile node provides indications of communication characteristics in its ongoing communications to the active radio access point. Handoff evaluations are performed responsive thereto.

In another aspect of the present invention, the active and target radio access points are not interconnected. An initial handoff evaluation procedure is performed taking into account measurements made by the mobile node of communication characteristics of its ongoing communications with the active radio access point. Results of the initial handoff evaluation process are thereafter sent to a central point. The central point is, in turn, connected to the target radio access point and measurements are solicited from the target radio access point of communication conditions thereat. A subsequent handoff evaluation process is performed at the central point and a decision to perform a handover of communications of the mobile node from the active radio access point to the target radio access point is made at the central point.

In another aspect of the present invention, a temporary identifier which is used to identify a mobile node is provided to the mobile node prior to a handover of communications with the mobile-node from an active radio access point to a target radio access point. Because the allocation of the temporary identifier is made prior to the handover, delays conventionally associated with assignation of an identifier to identify a mobile node subsequent to its handover to a target radio access point are obviated.

In one implementation, a mobile, packet-based communication system is provided in which communications are effectuated pursuant to Ipv6 protocols. The communication system includes a network infrastructure and a mobile node. Network infrastructure includes a radio access network portion and a core network portion. A DHCP server is positioned at the network infrastructure. The server includes a cache of temporary identifiers. Responsive to requests therefor by radio access points of the radio application network, temporary identifiers are provided to the radio access points. Prior to handover of communications of a mobile node connected to an active radio access point, a temporary identifier is allocated by the active radio access point to identify the mobile node as a care-of-address. Thereby, a temporary identifier is already assigned to the mobile node prior to its handover to a target radio access point. And, delays conventionally associated with assignation of identifiers to identify the mobile node subsequent to handover of communications to the target radio access point are obviated.

In these and other aspects, therefore, apparatus, and an associated method is provided for a wireless communication system having a mobile node operable to communicate by way of a network infrastructure with another communication node. The mobile node is moveable between a first position and at least a second position. When positioned at the first position, the mobile node is operable to communicate by way of a first subnetwork of the network infrastructure. When positioned at the at least the second position, communication handover is effectuated such that the mobile node is operable to communicate by way of a subnetwork of the mobile node. A temporary identifier is provided to the mobile node to identify the mobile node, thereby to permit routing of data packets thereto. A detector is coupled to detect indications of a decision to handover communications of the mobile node between the first and second subnetworks. An assignor is coupled to the detector. The assignor assigns the temporary identifier to the mobile node subsequent to detection by the detector of when the handover is to be effectuated and prior to effectuation of the handover.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
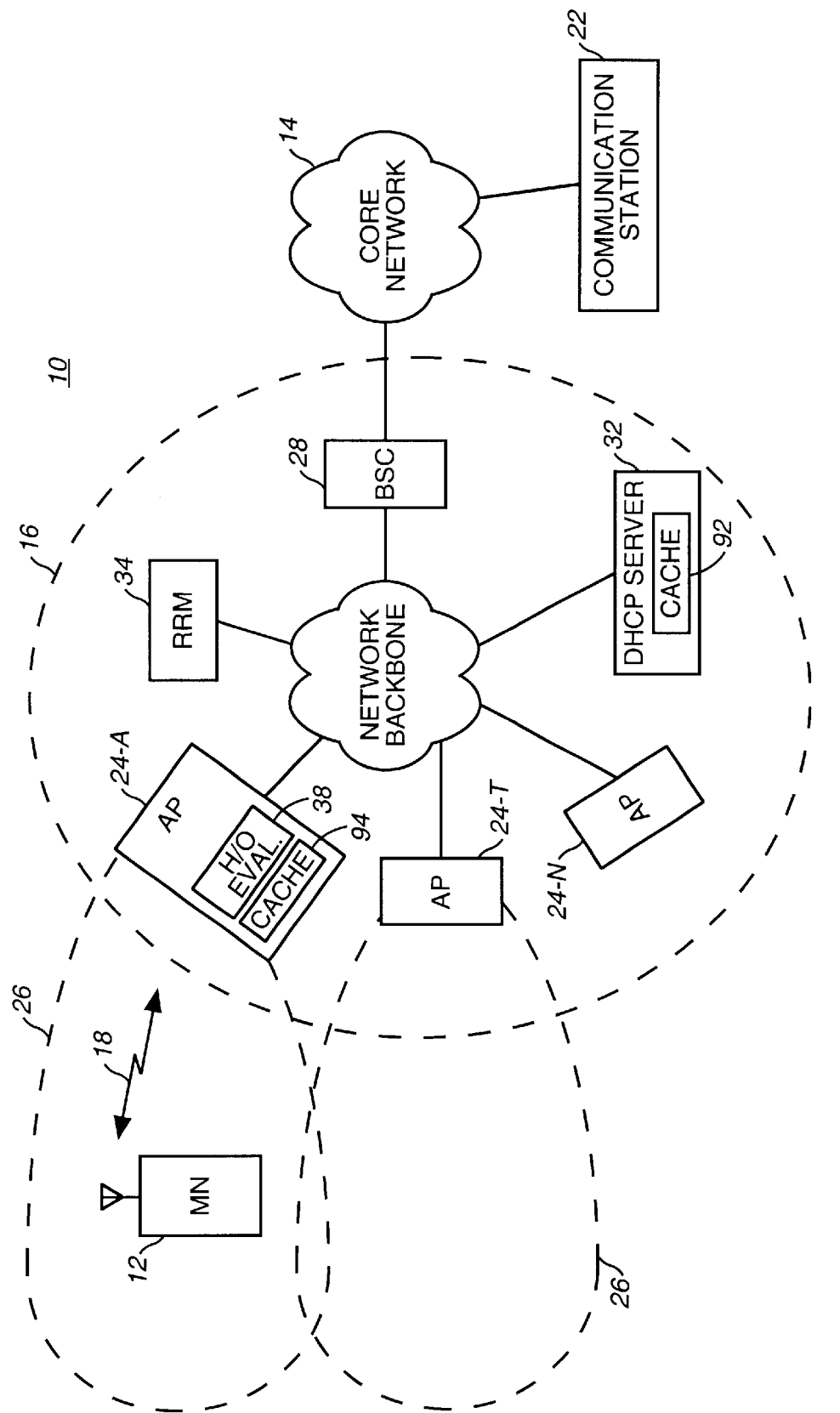
FIG. 1 illustrates a functional block diagram of a mobile communication system in which an embodiment of the present invention is operable.

Referring first to FIG. 1, a mobile communication system, shown generally at 10, provides for radio communications with mobile nodes, of which the mobile node 12 is exemplary. In the exemplary implementation, the communication system 10 forms a cellular communication system in which the mobile node 12 forms a mobile station operable therein. While the following of the present invention shall be described with respect to a cellular communication system, it should be understood at the outset that operation of an embodiment of the present invention is analogously also possible in other types of mobile communication systems in which communications with mobile nodes are handed over between radio access points as the mobile nodes moves through the area encompassed by the communication system. In other implementations, various embodiments of the present invention can similarly be described with respect to such other mobile communication systems.

The communication system 10 includes network infrastructure, here formed of a core network portion 14 and a radio access network portion 16. The core network is coupled to the radio access network portion 16 to permit communications between devices forming, or coupled to, the core network and the mobile node 12 by way of a communication path extending through the core network, the radio access network and a radio link 18 formed with the mobile node 12. A communication station 22 is representative of a device which is capable of communicating with the mobile node 12 by way of the communication path, so-formed. The communication station 22 shall herein also be referred to as a correspondent node.

The radio access network portion 16 is here shown to include a plurality of base transceiver stations 24, here designated 24-A (active), 24-T (target), and 24-N (nth base transceiver station/access point). each forming a radio access point (BTS/AP). Each of the base transceiver stations forming the access points defines a cell 26. When the mobile node 12 is positioned in a cell associated with a corresponding access point, communications are generally affected by way of a radio link with the associated access point. As the mobile node travels out of one cell and into another cell, communication handovers are effectuated to permit continued communications with the mobile node.

The radio access network portion 16 is further shown to include a base station controller 28 which is coupled to the base transceiver stations by way of, here, an IP (internet protocol) network backbone. In the exemplary implementation, a DHCPv6 server 32 also forms a portion of the radio access network portion as does also an RRM (radio resource manager) 34.

During operation of the communication system, signal measurements made by the mobile node are provided to an access point with which the mobile node is in communication by way of a radio link. Amongst the signal measurements made by the mobile node and provided to the access point are indications of communication characteristics of the communications between the mobile node and the appropriate access point.

An embodiment of the present invention provides for handoff evaluation functions to be performed at the access point 24-A with which the mobile node is in communication. Such access point is herein referred to as the active access point, and the element 38 positioned at an access point 24 is representative of the evaluation function performed at the base transceiver station. In contrast, conventional communication systems typically perform evaluation handover functions at a remote location, such as the base station controller 28, thereby necessitating substantial signaling with the respective access points.

Figure 2:
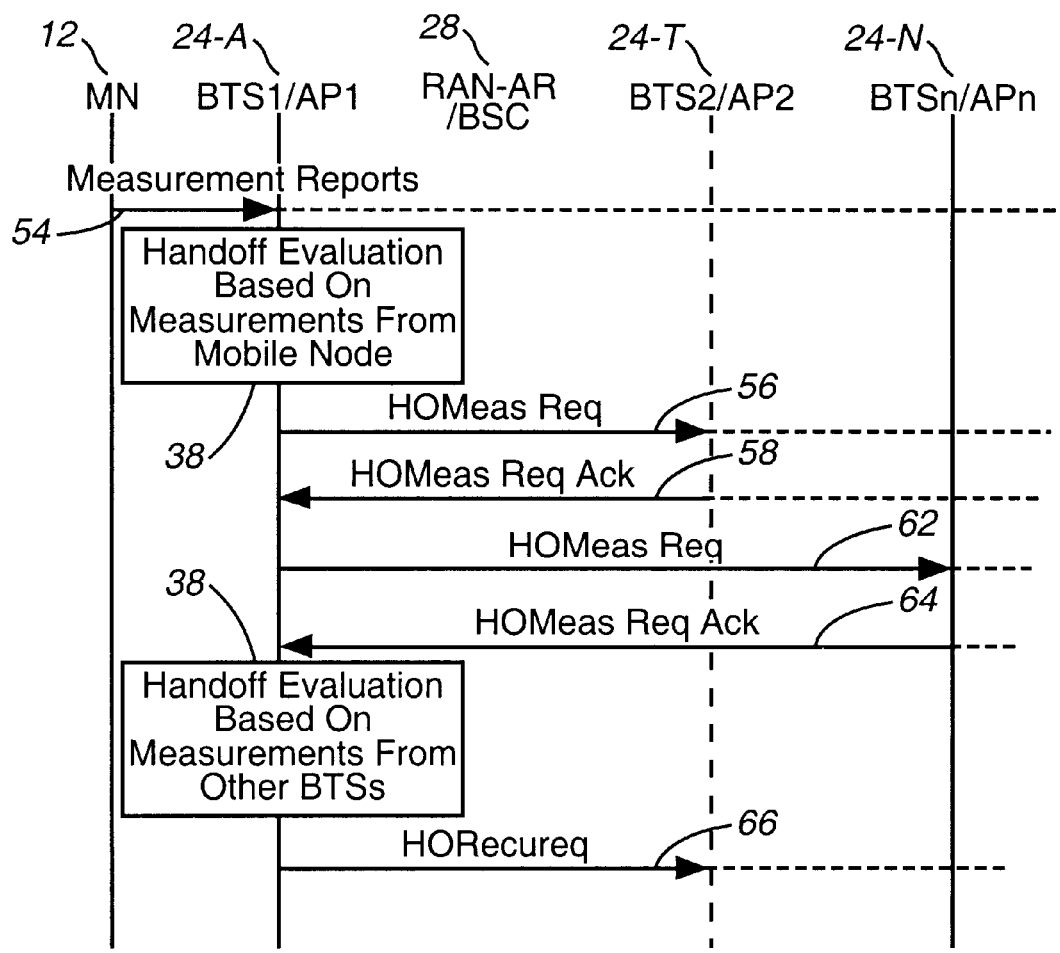
FIG. 2 illustrates a message sequence diagram representative of exemplary operation of an embodiment of the present invention.

In one implementation, the access points 24 are coupled theretogether so that the handoff evaluation function is provided directly with data related to a target access point to which a handover of communications is anticipated. In another implementation, in which the access points are not directly intercoupled, such information related to the target access point is provided by way of the base station controller, or other logical device, and portions of the handoff evaluation function are performed at both the active access point and at the base station controller FIG. 2 illustrates a message sequence diagram, shown generally at 52, representative of signaling generated during operation of an embodiment of the present invention by which to perform a handoff evaluation at an access point, such as a base transceiver station 24 of the communication system shown in FIG. 1. The sequence diagram is representative of operation of an embodiment of the present invention in which the access points are capable of communicating directly with each other. That is to say, the base transceiver stations which form the access points are interconnected.

First, and as indicated by the segment 54, signal measurement reports reporting on communication characteristics of communications between the mobile node and the active access point 24-A are provided to the active access point. Responsive to such measurement reports, a preliminary determination is made by the handoff evaluation function 38 (shown in FIG. 1) that a handover of communications is to be effectuated. Thereafter, and as indicated by the segment 56, a message is communicated to a prospective, target access point, here access points 24-T. The message is a request for measurements of communication conditions at the cell associated with the target access point.

Then, and as indicated by the segment 58, a message is returned from the target access point to the access active point including information related to the communication conditions in the target cell. Then, and as indicated by the segment 62, additional requests are made by the active access point of other potential target access points of communication conditions at the cells associated therewith. The message represented by the segment 62 is communicated to a potential, target access point 24-N. And, as indicated by the segment 64, a replay is returned to the active access point 24-A. Determinations are then made, indicated by the handover evaluation function block 38 as to whether a handover of communications from the active access point 24-A should be made. Here, a determination is made that a communication handover is to be effectuated with the target access point 24T. A handover required signal, indicated by the segment 66 is then communicated to the access point 24-T.

Figure 3:
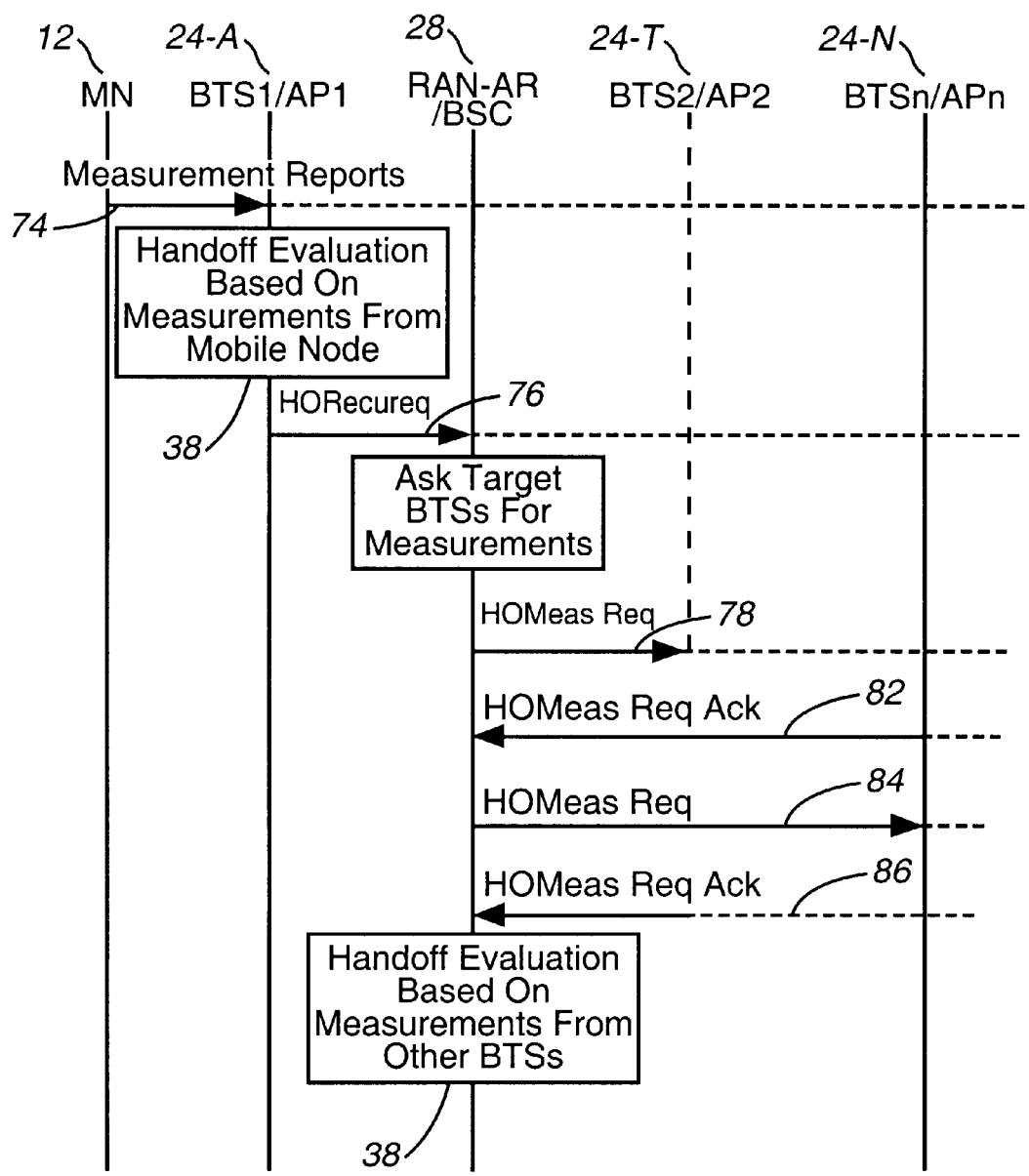
FIG. 3 illustrates a message sequence diagram, similar to that shown in FIG. 2, but representative of operation of an alternate embodiment of the present invention.

FIG. 3 illustrates a message sequence diagram, shown generally at 72 of an alternate embodiment of the present invention. In this implementation, handover evaluations are also performed. Here, though, the respective access points 24 are not intercoupled to permit direct communication there between. Because the access points are not interconnected, the messages indicated by the segments 58 and 64, shown in the message sequence diagram 52 of FIG. 2 cannot be directly provided to the active access point.

Again, the mobile node 12 provides indications of measurement reports of communication conditions in the cell associated with the active access point 24-A. The segment 74 is representative of communication over a radio link of the indications of the measurements made by the mobile node. The handoff evaluation function 38, responsive to such indications, determines whether a handoff of communications is to be made. Here, a preliminary determination that a handover of communications to a target access point is to be made. And, as indicated by the segment 76, the active access point generates a signal which is communicated to the base station controller 28 to indicate to the base station controller, that the handover of communications is to be effectuated. Subsequent to detection at the base station controller of the request, the base station controller initiates an evaluation of measurements made at potential, target access points. A request, indicated by the segment 78, is sent to the access points 24-T to request information related to communication conditions at the cell associated with the target access point. And, as indicated by the segment 82, the target access point returns indications of the measurements. Additional requests are made, here indicated by the segment 84 communicated to the target access point 24-N requests information related to communication characteristics at the cell associated therewith. And, the information is returned by the access point 24N to the base station controlled indicated by the segment 86.

Responsive to the information provided to the base station controller, a final handoff evaluation function is performed, indicated by 38'. And, a decision whether to effectuate handover of communications to a target access point is implemented.

In another embodiment of the present invention, a manner is provided by which to provide the mobile node 12 with a care-of-address each time the mobile node obtains a new point of attachment with the radio access network portion 16. The point of attachment changes, for instance, when a handover of communications is effectuated from an active access point to a target access point. The care-of-address forms a temporary identifier which is here assigned to the mobile node prior to a handover of communications so that delays conventionally associated with a request for the identifier subsequent to handover is obviated.

Referring back to FIG. 1, the DHCPv6 server 32 includes a storage cache 92 at which IP addresses, capable of forming temporary identifiers, are stored. When a mobile node, such as the mobile node 12 is to attach to an access point, or a handover request is to be effectuated, an IP address stored at the storage cache 92 is assigned to the mobile node to identify the mobile node thereby. If another handover is effectuated, a subsequent IP address is assigned to the mobile node to temporarily identify the mobile node once again.

The mobile node has assigned thereto a permanent IP address which is assigned thereto by a home network of the mobile node. The permanent IP address is known and used by all other correspondent nodes, such as the communication station 22, which communicates with the mobile node. However, when the mobile node is away from its home network, the temporary identifier is provided to the mobile node and utilized to route data packets thereto.

Here, the access points, formed of base transceiver stations, essentially form default routers for mobile nodes, such as the mobile nodes which are Ad attached thereto by way of radio links. And, the base transceiver station forming the access point and the air interface upon which the radio link is formed can be considered to be a subnet. When a mobile node is attached to the access point, the mobile node has a care-of-address that is relevant to the subnet. Data packets which are to be routed to the mobile node are routed thereto by way of the default router/access point utilizing normal routing protocols in the radio access network.

Each time in which the mobile node, such as the mobile node 12, changes its point of attachment, such as pursuant to a handover of communications, a new IP care-of-address is obtained. The permanent IP address assigned to the mobile node remains the same. But, a new care-of-address is assigned to the mobile node to permit data packets to immediately be provided between the correspondent node and the mobile node. When the mobile node is in an idle or dormant node, that is, when no active session is ongoing, a conventional stateless or stateful address autoconfiguration mechanism is utilized to associate an IP care-of-address to the mobile node.

Figure 4:
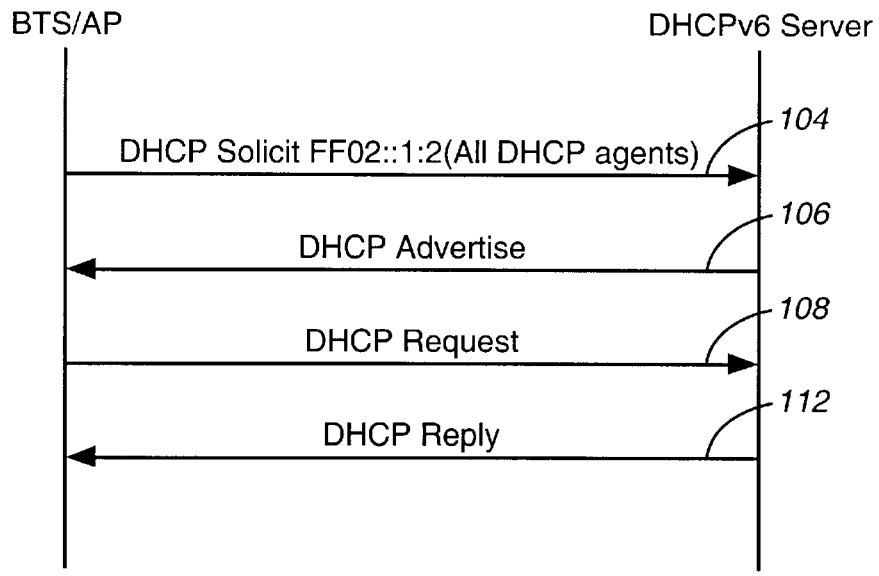
FIG. 4 illustrates a message sequence diagram, also representative of operation of embodiment of the present invention.

FIG. 4 illustrates a message sequence diagram, shown generally at 102, representative of operation of an embodiment of the present invention by which to provide temporary identifiers to a storage cache 94 of an access point. When needed to identify a mobile node, identifiers are retrieved from the storage cache 94 and assigned to identify a mobile node. The temporary identifiers are provided to the storage cache 94 at, for instance, system start up or responsive to operation of a network management element that controls the access points in the network.

First, and as indicated by the segment 104, a DHCP solicit message is generated by the access point and communicated to the DHCPv6 server 32. In the exemplary implementation, the message is multicast utilizing an all-DHCP-agent's address. Responsive thereto, the server 32 sends an advertised message, indicated by the segment 106, to the access point. The advertised message notifies the access point of the address of the server 32.

Thereafter, and as indicated by the segment 108, a DHCP request message is sent to the server 32, identified by the IP address of the server, to request a set of IP addresses. And, as indicated by the segment 112, a reply message is returned to the access point which contains the IP addresses which are stored at the storage cache 94.

When the radio resource manager 34 receives a handover request or otherwise determines that a mobile node, such as the mobile node 12, should be handed off to another access point in the network, the radio resource manager contacts the target access point to reserve radio resources thereat. At the same time, the target access point also reserves an IP address relevant to the subnet of which the target access point forms a portion.

Figure 5:
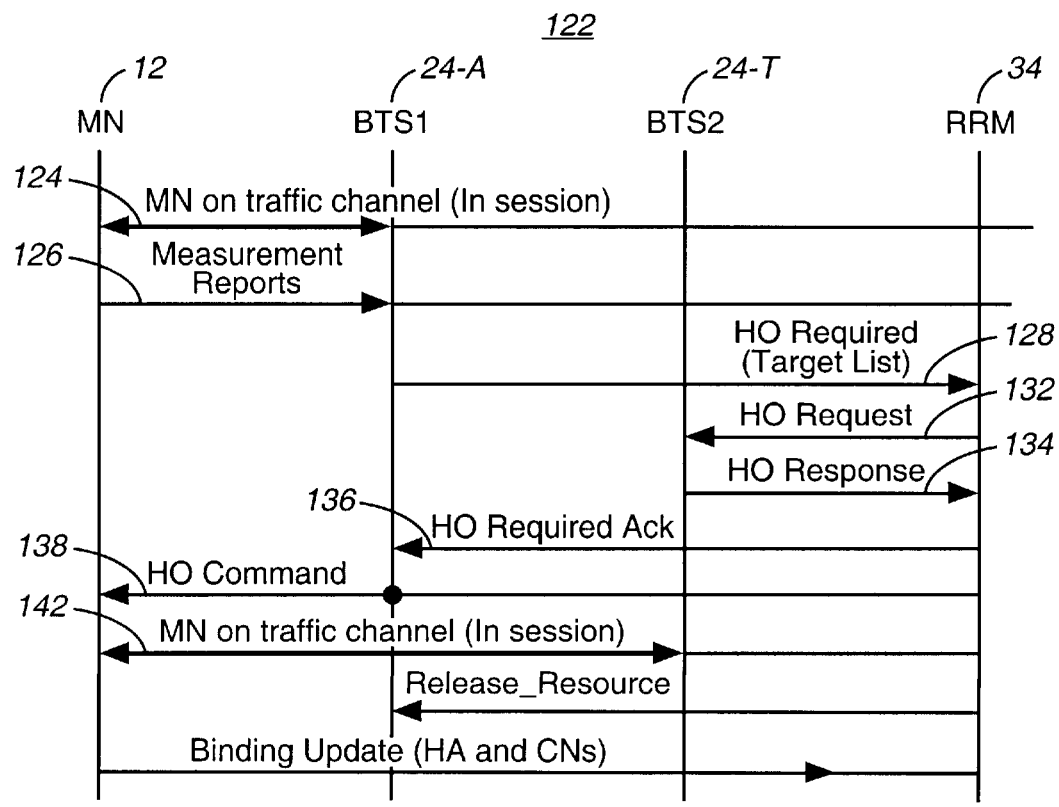
FIG. 5 illustrates a message sequence diagram, similar to that shown in FIG. 4, here representing additional operation of an embodiment of the present invention.

FIG. 5 illustrates a message sequence diagram, shown generally at 122, representative of the manner by which signals are generated during handover to provide temporary identifiers to identify a mobile node, here the mobile node 12.

Segment 124 is representative of communication between the mobile node and the active access point 24-A during a communication session. The mobile node 12 has a care-of-address that is relative to the subnet defined by the active access point 24-A. During the communication session, for instance, a voice session, the mobile node is on a traffic channel. Measurement reports are also generated by the mobile node and communicated to the active access point. Communication of the measurement reports is indicated by the segment 126.

Thereafter, and as indicated by the segment 128, the active access point determines from measurements received thereat by the mobile node that a handover of communications to the target access point 24-T should be effectuated. Responsive to such a determination, a handover required message is communicated, again, as indicated by the segment 128, to the radio resource manager 34. The request contains a possible target list.

Then, and as indicated by the segment 132, the resource manager sends a handover request to the target access point to reserve the radio resources for the mobile node 12 at the target access point. Then, and as indicated by the segment 134, the target access point reserves the radio resources to be allocated to the mobile node. An unused IP address from its storage cache is selected and a response is sent to the resource manager.

Thereafter, and as indicated by the segment 136, an acknowledgement indication is returned to the active access point. The acknowledgement indication contains information about the radio resources and also of the temporary IP address to be used by the mobile node 12 subsequent to handover of communications to the target access point.

Then, and as indicated by the segment 138, the active access point sends a handover command to the mobile node. At the same time, the active access point starts either forwarding traffic destined for the mobile node to the target access point at its new IP address or, alternately, the active access point can start bicasting data packets to the current IP address assigned to the mobile node and also to the new care-of-address assigned to the mobile node by the target access point. The handover command instructs the mobile node 12 to tune to channels assigned by the target access point. The command also contains the IP address to be used by the mobile node as the mobile node's care-of-address subsequent to handover to the target access point.

Thereafter, and as indicated by the segment 142, the handover of communications is effectuated, and communications thereafter are effectuated between the mobile node and the target access point.

The segment 144 is representative of an inband message from the mobile node to send a resource release message to the now-prior active access point. The new active access point, the previous-target access point sends a release resource message to the prior active access point. This causes the prior active access point to reclaim the IP address that had been allocated and assigned to the mobile node as the mobile node's care-of-address while the mobile node was connected thereto. The address is then put back into the cache of the prior active access point.

The segment 144 is representative of connection of the mobile node to the new, active access point at which the mobile node exhibits a new care-of-address. The mobile node sends a binding update to the HA and any other correspondent nodes.

If there is a hierarchical scheme of mobility agents in the radio access network, then the binding update need not be propagated to the HA and the correspondent nodes. The binding update shall only be localized to the ratio access network.

Thereby, manner is provided by which better perform handover evaluation functions and also to provided temporary identifiers to form care-of-addresses of mobile nodes operable in a mobile communication system. Implementation of an embodiment of the present invention is possible in any of many types of mobile communication systems including communication systems which utilized TDMA, CDMA, and other communication schemes.

The previous descriptions are of preferred examples for implementing the invention, and the scope of the invention should not necessarily be limited by this description. The scope of the present invention is defined by the following claims.

We claim:

1. In a wireless communication system having a mobile node operable to communicate by way of a network infrastructure with another communication node, the mobile node movable between a first position and at least a second position, when positioned at the first position, the mobile node is operable to communicate by way of a first subnetwork defined by a first radio access point of the network infrastructure, and when positioned at the at least the second position, communication handover is effectuated such that the mobile node is operable to communicate by way of a second subnetwork defined by a second radio access point, an improvement of apparatus for providing a temporary identifier to the mobile node to identify the mobile node, thereby to permit routing of data packets thereto, said apparatus comprising:

a detector having at least a portion embodied at the first radio access point and coupled to detect indications of a decision to handover communications of the mobile node between the first and second subnetworks;

a radio-access-point cache positioned at the first radio access point, said radio-access-point cache for cacheing temporary identifiers thereat; and an assignor having at least a portion embodied at the first radio-access-point and coupled to said detector, said assignor for assigning the a selected temporary identifier from the radio-access-point cache to the mobile node subsequent to detection by said detector of when the handover is to be effectuated and prior to effectuation of the handover.

2. The apparatus of claim 1 wherein the indications of the decision to handover communications are generated, at least in part, responsive to initiation by the mobile node.

3. The apparatus of claim 1 wherein the network infrastructure comprises a radio access network and a core network, the radio access network having a network-infrastructure cache device of caching temporary identifiers, at least a portion of said assignor located at the network-infrastructure cache device.

4. The apparatus of claim 3 wherein the temporary identifiers are initially stored at the portion of said assignor located at the network-infrastructure cache device and at least some of the temporary identifiers are at least copied to the radio-access-point cache, accessible therefrom by the portion of the said assignor located at the second cache device.

5. The apparatus of claim 4 wherein each subnetwork comprises a portion of the radio access network, each subnetwork including a radio-access-point, and wherein said radio-access-point cache device comprises radio-access-point cache device portions embodied at each base transceiver station radio-access-point.

6. The apparatus of claim 5 wherein the radio access network includes a server and wherein the network-infrastructure cache device at which the portion of the said assignor is located is embodied at the server.

7. The apparatus of claim 1 wherein one of the first and at least second subnetworks forms an active subnetwork and wherein the decision to handover communications of the mobile node between the first and second subnetworks is made at the active network.

8. The apparatus of claim 7 wherein the first and at least second subnetworks are intercoupled, wherein one of the fist and at least second subnetworks forms a target subnetwork to which the handover of communications is to be effectuated, wherein indications of communication conditions at the target subnetwork are provided to the active subnetwork, and wherein the decision to handover communications made at the active subnetwork is further responsive to the indications of the communication conditions at the target subnetwork.

9. The apparatus of claim 7 wherein the network infrastructure comprises a radio access network and a core network coupled thereto, wherein the first and at least second subnetwork forms portions of the radio access networks one of the first and at least second subnetworks forming an active subnetwork, wherein the mobile node provides indications of communication conditions at the active subnetwork, and wherein the indications of the decision to handover communications are generated, at least in part, responsive to the indications of the communication conditions at the active subnetwork.

10. The apparatus of claim 9 wherein at least a portion of said assignor is located at the active subnetwork and wherein, further responsive to the indications of the communication conditions provided by the mobile node, a request is made for indications of communication conditions at a target subnetwork, the target subnetwork formed of another of the first and at least second subnetworks.

11. The apparatus of claim 10 wherein indications of the communication conditions at the target subnetwork are provided to the portion of the assignor located at the active subnetwork, and wherein the indications of the decision to handover communications are generated, in part, responsive to the indications of the communication conditions.

12. In a method for communicating in a wireless communication system having a mobile node operable to communicate by way of a network infrastructure with another communication ode, the mobile node movable between a first positioned and at least a second position, when positioned at the first position, the mobile node is operable to communicate by way of a first subnetwork defined by a first radio-access-point of the network infrastructure, and when positioned at the at least the second position, communication handover is effectuated such that the mobile node is operable to communicate by way of a second subnetwork defined by a second radio-access-point of the network infrastructure, an improvement of a method for providing a selected temporary identifier to the mobile node to identify the mobile node, thereby to permit routing of data packets thereto, said method comprising:

cacheing, at the first radio-access-point, temporary identifiers usable to identify the mobile node;

detecting at the first radio access point when a decision to handover communications of the mobile node between the first and second subnetworks is made; and assigning the selected temporary identifier, selected from the temporary identifiers cached during said operation of cacheing, to the mobile node subsequent to detection by said detector of when the handover is to be effectuated and prior to effectuation of the handover.

13. The method of claim 12 further comprising the operation, prior to said operation of detecting of:

requesting, by the mobile node, the handover of the communications.

14. The method of claim 13 wherein the selected temporary identifier assigned during said operation of assigning is retrieved from a cache at which temporary identifiers are cached during said operation of cacheing.

15. The method of claim 14 wherein the network infrastructure comprises a radio access network and a core network and wherein said operation of assigning is performed at the first radio-access-point of the radio access network.

16. The method of claim 12 wherein the first subnetwork forms an active subnetwork and wherein the decision, detected during said operation of detecting, to handover communications is made at the active subnetwork.

17. The method of claim 16 wherein the decision, detected during said operation of detecting, is further responsive to indications of communication conditions at the target subnetwork.

18. The method of claim 17 further comprising the additional operation of providing the indications of the communication conditions at the target subnetworks to the active network.

19. The method of claim 18, wherein the active subnetwork and the target subnetwork are intercoupled and wherein the indications of the communication conditions at the target subnetwork provided to the active subnetwork are provided directly thereto.

* * * * *